UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

1,425,573. Specification of Letters Patent. Patented Aug. 15, 1922.

No Drawing. Application filed January 16, 1919. Serial No. 271,488.

*To all whom it may concern:*

Be it known that we, RAYMOND C. BENNER and HARRY F. FRENCH, citizens of the United States, and residents, respectively, of Fremont, in the county of Sandusky and State of Ohio, and Fremont, in the county of Sandusky and State of Ohio, have invented a certain new and useful Improvement in Electric Batteries, of which the following is a full, clear, and exact description.

This invention relates to electric batteries, and although particularly applicable to dry cells it will be apparent that the improvements are also useful in connection with wet batteries, although the invention will be described particularly as applied to dry cells, as this is the type to which the invention seems especially suitable.

In the usual form of dry cell a paste generally made from flour or other farinaceous material, with water and zinc chloride, is placed adjacent the zinc container electrode. This is done in various ways according to the particular construction of the cell. Where a bibulous paper lining is inserted between the zinc can and mix, the paste is usually applied to the outside of the lining; but in bag type cells the paste fills the space between the cartridge and zinc container. The principal purpose of the paste is to improve the shelf life or to decrease deterioration. This deleterious action as a rule is due to local action or corrosion of the zinc, and one of the objects of the present invention is to eliminate the use of paste by otherwise decreasing corrosion.

The use of paste is not only undesirable from a manufacturing standpoint, on account of the difficulty of manipulating the pasted linings, but is also disadvantageous because of the difficulty at times in obtaining flour for such purposes, especially wheat flour in times of food scarcity. Our invention, however, must not be understood as necessarily limited to non-paste cells, as the decreasing of local action and corrosion is desirable even with the paste construction.

It is well known that the amalgamation of zincs with mercury decreases local action, but mercury is expensive and sometimes hard to obtain in sufficient quantities. According to this invention the corrosion is decreased by the use of other materials, so that the amount of mercury may be decreased, or if necessary, entirely eliminated. Since corrosion is an especially important factor on light current drains in dry cells, and a relatively less important factor on heavy current drains, the invention is especially applicable to cells intended for light service and over extended periods.

The invention consists in the use of lead as a plating or coating on the active surface of the zinc electrode. There are various methods by which this plating or coating may be accomplished. We have found that a satisfactory plating of lead on the active surface of the zinc is obtained by first cleaning the inside of the zinc can with a mixture of chromic and sulphuric acids, and then plating with lead, either from a solution of lead acetate acidified with acetic acid, or from a solution of lead silico-fluoride acidified with hydro-fluo-silicic acid. It will of course be understood that other methods of lead plating could be used involving either chemical or electrolytic actions. The amount of lead plated out on the zinc is relatively small, but in any case the zinc will be exposed to the plating process for a sufficient time to permit the zinc to be entirely coated with lead.

The zinc can thus plated with lead on the inside is combined with the usual dry cell construction consisting of a carbon electrode, a mix of manganese peroxide and carbon, and electrolyte containing zinc and ammonium chlorides, and a seal arranged in a well known manner.

Very superior results are obtained by another method of using the lead according to our invention. This method consists in utilizing its effect in combination with mercury in different ways. When used with mercury the lead may be plated on the zinc first and the mercury plated on the zinc thereafter, or the reverse process may be used with substantially the same result. The mercury and lead may also be simultaneously plated on the zinc without departing from the invention. The only requirement seems to be that a thorough coating upon the zinc be produced.

The invention would be applied in a substantially similar manner when utilized in connection with wet batteries.

Having described our invention, what we claim is:—

1. In electric batteries, a negative electrode of zinc having lead material associated therewith, 2. In electric batteries, a negative electrode of zinc having lead material associated with the active surface thereof.

3. In electric batteries, a negative electrode of zinc having a coating of lead material on the active surface.

4. In electric batteries, a negative electrode of zinc having mercury and lead material associated therewith.

5. In electric batteries, a negative electrode of zinc having mercury associated therewith and a coating of metallic lead.

6. In electric batteries, a negative electrode of zinc having mercury and lead material associated with the active surface.

7. In electric batteries, a positive electrode, a mix containing manganese peroxide and carbon associated with an electrolyte containing chlorides, and a negative electrode of zinc having a coating of metallic lead on its active surface.

8. In electric batteries, a positive electrode, a mix containing manganese peroxide and carbon associated with a chloride electrolyte, a bibulous substance adjacent the mix and a negative container electrode having a coating of metallic lead on its active surface.

In testimony whereof, we hereunto affix our signatures.

RAYMOND C. BENNER.
HARRY F. FRENCH.